United States Patent Office 3,234,090
Patented Feb. 8, 1966

3,234,090

PHARMACEUTICAL COMPOSITIONS COMPRISING SATURATED BASIC ETHERS

Charles Ferdinand Huebner, Chatham, and William Laszlo Bencze, New Providence, N.J., assignors to Ciba Corporation, New York, N.Y., a corporation of Delaware No Drawing. Filed Sept. 10, 1962, Ser. No. 222,627
3 Claims. (Cl. 167—58)

This is a continuation-in-part application of our application Serial No. 160,291, filed December 18, 1961, now abandoned.

The present invention concerns basic ethers. More particularly, it relates to compounds having the formula

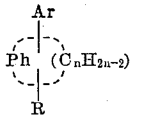

in which Ph is a 1,2-phenylene radical, Ar is a monocyclic carbocyclic aryl group substituted by tertiary amino-lower alkyl-oxy, in which tertiary amino is separated from oxy by at least two carbon atoms, R is hydrogen, an aliphatic radical, a carbocyclic aryl radical, a carbocyclic aryl-aliphatic radical, a heterocyclic aryl radical or a heterocyclic aryl aliphatic radical, the group of the formula —$(C_nH_{2n-2})$— stands for an unbranched alkylene radical having from three to five carbon atoms and carrying the groups Ar and R, salts, N-oxides, salts of N-oxides or quaternary ammonium compounds thereof, as well as procedure for the preparation of such compounds.

The 1,2-phenylene (o-phenylene) radical is unsubstituted or may be substituted by one or more than one of the same or of different substituents attached to any of the four positions available for substitution. Substituents are, for example, lower alkyl, e.g. methyl, ethyl, n-propyl, isopropyl and the like, hydroxyl, etherified hydroxyl, such as lower alkoxy, e.g. methoxy, ethoxy, n-propyloxy, isopropyloxy, n-butyloxy and the like, lower alkenyloxy, e.g. allyloxy and the like, lower alkylenedioxy, e.g. methylenedioxy and the like, esterified hydroxyl, such as halogeno (representing hydroxyl esterified by a hydrohalic acid), e.g. fluoro, chloro, bromo and the like, nitro, amino, such as N,N-di-lower alkylamino, e.g. N,N-dimethylamino, N,N-diethylamino and the like, trifluoromethyl, acyl, such as lower alkanoyl, e.g. acetyl, propionyl, pivaloyl and the like, benzoyl, pyridoyl, e.g. nicotinoyl and the like, or any other suitable substituent. The 1,2-phenylene group Ph in the above formula is primarily 1,2-phenylene, (lower alkyl)-1,2-phenylene, (hydroxy)-1,2-phenylene (etherified hydroxy)-1,2-phenylene, such as lower alkoxy)-1,2-phenylene, (lower alkenyloxy)-1,2-phenylene, (lower alkylenedioxy)-1,2-phenylene and the like, (esterified hydroxy)-1,2-phenylene, such as (halogeno)-1,2-phenylene and the like, (nitro)-1,2-phenylene, (amino)-1,2-phenylene, such as (N,N-di-lower alkyl-amino)-1,2-phenylene and the like, (trifluoromethyl)-1,2-phenylene, (acyl)-1,2-phenylene, such as (lower alkanoyl)-1,2-phenylene, (benzoyl)-1,2-phenylene, (pyridoyl)-1,2-phenylene and the like, or any other suitably substituted- 1,2-phenylene group.

The group of formula —$(C_nH_{2n-2})$— represents an unbranched alkylene radical having from three to five carbon atoms (the letter $n$ in the above groups stands for an integer from three to five); this alkylene radical is attached to the two adjacent positions of the 1,2-phenylene radical Ph and carries the groups Ar and R defined below. Thus, an unbranched alkylene radical of the formula —$(C_nH_{2n-2})$— represents 1,3-propylene, 1,4-butylene or 1,5-pentylene, to which are attached the groups Ar and R. The compounds of this invention are, therefore, compounds of the indane series, as well as compounds having the 1,2,3,4-tetrahydronaphthalene, benzosuberane and the like, ring systems.

A tertiary amino-lower alkyl-oxy substituent, which may be attached to any of the positions, preferably to the 4-position, available for substitution in the monocyclic carbocyclic aryl group Ar, may be represented by the formula: —O—$(C_mH_{2m})$—Am, in which the group of the formula —$(C_mH_{2m})$— stands for lower alkylene, having preferably from two to seven carbon atoms (i.e. the letter $m$ is an integer having preferably from two to seven, both inclusive), and separates the tertiary amino group Am from the oxygen atom by at least two carbon atoms. The group of the formula —$(C_mH_{2m})$— stands preferably for alkylene having from two to three carbon atoms (i.e. the letter $m$ stands preferably for an integer from two to three) and separates the tertiary amino group Am from the oxygen atom by two to three carbon atoms. Such alkylene group is preferably 1,2-ethylene, 1-methyl-1,2-ethylene, 2-methyl-1,2-ethylene, 1,3-propylene, but may also be 1,3-butylene, 2,3-butylene, 3,4-butylene, 1,4-butylene, 1,4-pentylene, 1,5-pentylene, 1,5-hexylene, 1,6-hexylene, 1,7-heptylene and the like.

A tertiary amino group, such as the group Am in the above formula, is, for example, N,N-di-substituted amino, in which each of the substituents is, for example, an aliphatic radical, such as lower alkyl, lower alkenyl, and the like, a cycloaliphatic radical, such as cycloalkyl and the like, a cycloaliphatic-aliphatic radical, such as cycloalkyl-lower alkyl and the like, a carbocyclic aryl radical, such as monocyclic carbocyclic aryl and the like, a carbocyclic aryl-aliphatic radical, such as monocyclic carbocyclic aryl-lower alkyl and the like, which radicals have from one to ten carbon atoms. Preferred as substituents are lower alkyl, e.g. methyl, ethyl, propyl, isopropyl, butyl, isobutyl, secondary butyl, pentyl, neopentyl and the like; other substituents are lower alkenyl, e.g. allyl, 2-methylallyl and the like, cycloalkyl having from three to seven, preferaby from five to six, ring carbon atoms, e.g. cyclopentyl, cyclohexyl and the like, cycloalkyl-lower alkyl, in which cycloalkyl has from three to seven, preferably from five to six, ring carbon atoms, e.g. cyclopentylmethyl, 2-cyclohenxylethyl and the like, monocyclic carbocyclic aryl, e.g. phenyl and the like, or monocyclic carbocyclic aryl-lower alkyl, such as phenyl-lower alkyl, e.g. benzyl, 1-phenylethyl, 2-phenylethyl and the like. N,N-di-substituted amino groups are primarily N,N-di-lower alkyl-amino, in which lower alkyl has preferably from one to four carbon atoms, e.g. N,N-dimethylamino, N-methyl-N-ethylamino, N,N-diethyl-amino, N,N-di-n-propylamino, N,N,-di-isopropylamino and the like, as well as N-cycloalkyl-N-lower alkyl-amino, in which cycloalkyl has from five to six ring carbon atoms, and ower alkyl has preferably from one to four carbon atoms, e.g. N-cyclopentyl-N-methyl-amino, N-cyclohexyl-N-methyl-amino, N-cyclohexyl-N-ethyl-amino and the like, or N-lower alkyl-N-phenyl-lower alkyl-amino, in which lower alkyl has preferaby from one to four carbon atoms, e.g. N-benzyl-N-methyl-amino, N-benzyl-N-ethyl-amino, N - ethyl - N-(1-phenylethyl)-amino, N-methyl-N-(2-phenylethyl)-amino and the like, or any other equivalent N,N-di-substituted amino group. The substituents, particularly lower alkyl, may also carry functional groups, such as hydroxyl, lower alkoxy, e.g. methoxy, ethoxy and the like, lower alkyl-mercapto, e.g. methylmercapto, ethylmercapto and the like, or any other suitable functional group. N,N-di-substituted-amino groups, in which the substituents carry functional groups, are, for example, N-hydroxy-lower alkyl-N-lower alkyl-amino, e.g. N-(2-hydroxyethyl)-N-methyl-amino and the like, N,N-di-hydroxy-lower alkyl-amino, e.g. N,N-di-(2-hydroxyethyl)-amino and the like.

The tertiary amino group, such as the group Am in the above formula, may also represent 1-N,N-alkylene-imino, in which alkylene has from four to eight carbon atoms, 1-N,N-aza-alkylene-imino group, in which alkylene has from four to six carbon atoms, or 1-N,N-oxa-alkylene-imino and 1-N,N-thia-alkylene-imino, in which alkylene has preferably four carbon atoms. Together with the nitrogen atom, these alkylene, aza-alkylene- oxa-alkylene or thia-alkylene radicals represent 1-N,N-alkylene-imino, in which alkylene has from four to eight carbon atoms, such as 1-pyrrolidino groups, e.g. 1-pyrrolidino, 2-methyl-1-pyrrolidino and the like, 1-piperidino groups, e.g. 1-piperidino, 2-methyl-1-piperidino, 4-methyl-1-piperidino, 3-hydroxy-1-piperidino, 3-acetoxy-1-piperidino, 3-hydroxymethyl-1-piperidino and the like, 1-N,N-(1,6-hexylene)-imino, 1-N,N-(1,7-heptylene)-imino and the like, 1-N,N-(azo-alkylene)-imino, particularly 1-N,N-(N-lower alkyl-aza-alkylene)-imino, in which alkylene has from four to six carbon atoms, such as 1-piperazino or particularly 4-lower alkyl-1-piperazino, e.g. 4-methyl-1-piperazino, 4-ethyl-1-piperazino and the like, as well as 4-hydroxyethyl-1-piperazino, 4-acetoxyethyl-1-piperazino and the like, 1-N,N-(3-aza-1,6-hexylene)-imino, particularly 1-N,N-(3-aza-3-lower alkyl-1,6-hexylene)-imino, e.g. 1-N,N-(3-aza-3-methyl-1,6-hexylene)-imino and the like, or 1-N,N-4-aza-1,7-heptylene)-imino, particularly 1-N,N-(4-aza-4-lower alkyl-1,7-heptylene)-imino, e.g. 1-N,N-(4-aza-4-methyl-1,7-heptylene)-imino and the like, 4-morpholino groups, e.g. 4-morpholino, 3-methyl-4-morpholino and the like, 4-thiamorpholino groups, e.g. 4-thiamorpholino and the like, or any other equivalent tertiary amino group.

In the tertiary amino-lower alkyl-oxy group, the lower alkyl group, either partially or in toto, may form part of a saturated heterocyclic ring system, of which the tertiary amino group Am is a member and is separated from the oxy group by at least two carbon atoms. Such tertiary amino-lower alkyl group is, for example, 1-methyl-2-piperidinomethyl, 1-methyl-3-piperidinomethyl, 1-ethyl-4-piperidino, 1-methyl-3-pyrrolidinomethyl and the like.

Apart from the tertiary amino-lower alkyl-oxy group, the monocyclic carbocyclic aryl group Ar, which represents above all a tertiary amino-lower alkyl-oxy-phenyl group, may have one or more than one other substituent, which may be attached to any of the positions available for substitution. Such substituents are represented above all by halogeno, e.g. fluoro, chloro, bromo or iodo, as well as by lower alkyl, e.g. methyl, ethyl, isopropyl and the like, lower alkoxy, e.g. methoxy, ethoxy, n-propyloxy and the like, halogeno-lower alkyl, e.g. trifluoromethyl and the like, or any other suitable substituent, for example, an additional tertiary amino-lower alkyl-oxy group of the formula —O—($C_mH_{2m}$)—Am.

The group R attached to one of the carbon atoms of the alkylene group of the formula —($C_nH_{2n-2}$)— is primarily hydrogen, but may also stand for an aliphatic group, particularly lower alkyl, e.g. methyl, ethyl, n-propyl, isopropyl and the like, a carbocyclic aryl, particularly a monocyclic carbocyclic aryl, radical, e.g. phenyl or substituted phenyl, in which one or more than one of the same or of different substituents may substitute any of the positions available for substitution, such as (lower alkyl-phenyl, in which lower alkyl has preferably from one to four carbon atoms and is, for example, methyl, ethyl, n-propyl, isopropyl, n-butyl and the like, (lower alkoxy)-phenyl, in which lower alkoxy has preferably from one to four carbon atoms, and represents, for example, methoxy, ethoxy, n-propyloxy, ispropyloxy and the like, (halogeno)-phenyl, in which halogeno stands for fluoro, chloro, bromo and the like, (nitro)-phenyl, (N,N-di-lower alkyl-amino)-phenyl, in which lower alkyl has preferably from one to four carbon atoms, and N,N-di-lower alkyl-amino is, for example, N,N-dimethyl-amino, N-ethyl-N-methyl-amino, N,N-diethylamino and the like, (tri-fluoromethyl)-phenyl and the like, as well as [Am—($C_mH_{2m}$)—O—]-phenyl, in which Am and the group —($C_mH_{2m}$)— have the previously given meaning, a carbocyclic aryl-aliphatic, such as a monocyclic carbocyclic aryl-lower alkyl, radical, particularly phenyl-lower alkyl, e.g. benzyl, 1-phenylethyl, 2-phenylethyl, diphenylmethyl and the like, or substituted phenyl-lower alkyl, such as (lower alkyl)-phenyl-lower alkyl, (lower alkoxy)-phenyl-lower alkyl, (halogeno)-phenyl-lower alkyl, (nitro)-phenyl-lower alkyl, (N,N-di-lower alkyl-amino)-phenyl-lower alkyl, (trifluoromethyl)-phenyl-lower alkyl, [Am—($C_mH_{2m}$)—O—]-phenyl-lower alkyl and the like, in which lower alkyl, lower alkoxy, halogeno, N,N-di-lower alkyl-amino, and Am—($C_mH_{2m}$)—O— have the previously-given meaning, a heterocyclic aryl, particularly monocyclic heterocyclic aryl, radical, such as pyridyl, e.g. 3-pyridyl, 4-pyridyl and the like, or a heterocyclic aryl-aliphatic, particularly a monocyclic heterocyclic aryl-lower alkyl, radical, such as pyridyl-lower alkyl, e.g. 2-pyridylmethyl and the like.

Salts of the compounds of this invention are acid addition salts, such as pharmaceutically acceptable, non-toxic acid addition salts with inorganic or organic acids, for example, mineral acids, e.g. hydrochloric, hydrobromic, sulfuric, phosphoric acids and the like, organic carboxylic acids, e.g. acetic, propionic, pivalic, glycolic, lactic, malonic, succinic, maleic, hydroxy-maleic, malic, tartaric, citric, benzoic, salicyclic, 2-acetoxybenzoic, nicotinic, isonicotinic acid and the like, or any other suitable carboxylic acid, as well as organic sulfonic acids, e.g. methane sulfonic, ethane sulfonic, ethane, 1,2-disulfonic, 2-hydroxyethane sulfonic, p-toluene sulfonic, naphthalene 2-sulfonic acid and the like, or any other suitable acid. Other acid addition salts may be useful as intermediates in the preparation of pharmaceutically acceptable, non-toxic acid addition salts or in the purification of the free base, as well as for identification or characterization purposes. Salts, which are prepared primarily for identification purposes, are, for example, those with acidic organic nitro compounds, e.g. picric, picrolonic, flavianic acid and the like, or metal complex acid, e.g. phosphotungstic, phosphomolybdic, chloro-platinic, Reinecke acid and the like. Mono or poly-salts may be formed depending on the number of salt-forming groups and/or the conditions used for the salt formation.

Also included within the scope of the present invention are the N-oxides of the aforementioned compounds, as well as the acid addition salts of such N-oxides, for example, the pharmaceutically acceptacle, non-toxic acid addition salts of N-oxides, such as those with the above-mentioned acids.

Quaternary ammonium compounds of the compounds of this invention are those formed with reactive esters from alcohols and strong inorganic or organic acids, particularly those with lower aliphatic hydrocarbon halides, sulfates, or sulfonates, such as lower alkyl halides, e.g. methyl, ethyl, n-propyl or isopropyl chloride, bromide, iodide and the like, di-lower alkyl sulfates, e.g. dimethyl sulfate, diethyl sulfate and the like, lower alkyl lower alkane sulfonates, e.g. ethyl or methyl methane sulfonate, ethane sulfonate and the like, lower alkyl lower hydroxy-alkane sulfonates, e.g. methyl 2-hydroxy-ethane sulfonate and the like, or lower alkyl monocyclic carbocyclic aryl sulfonates, e.g. methyl p-toluene sulfonate, ethyl p-toluene sulfonate and the like, as well as those with carbocyclic aryl-aliphatic halides, such as phenyl-lower alkyl halides, e.g. benzyl, 1-phenylethyl or 2-phenylethyl chloride, bromide or iodide and the like. Also included as quaternary ammonium compounds are the corresponding quaternary ammonium hydroxides, and the quaternary ammonium salts with other acids, particularly those with the organic carboxylic acids mentioned hereinabove.

The compounds of this invention have antifungal properties and can be used accordingly. For example, they show antidematophyte effects against fungi causing superficial dermatophytoses, such as *Trichophyton mentagrophytes,* and can be used in the treatment of infections caused by such microorganism.

In addition, compounds of this invention have estrogenic properties, and can be used accordingly, for example, in raising animals to obtain increased weight gain and increased efficiency of feed utilization and the like.

Particularly useful are the compounds of the formula:

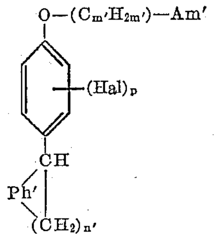

in which Ph' stands primarily for 1,2-phenylene, as well as (lower alkyl)-1,2-phenylene, (lower alkoxy)-1,2-phenylene, (halogeno)-1,2-phenylene, (nitro)-1,2-phenylene, (N, N-di-lower alkyl-amino)-1,2-phenylene or (trifluoromethyl)-1,2-phenylene, the group of the formula $$—(CH_2)_{n'}—$$

stands for an unbranched alkylene radical having from two to three, preferably two, carbon atoms (i.e. the letter *n'* stands for one of the integers 2 and 3, preferably for the integer 2), Am stands above all for N,N-di-lower alkyl-amino, as well as N,N-alkylene-imino, in which alkylene has from four to seven carbon atoms, 4-morpholino or 4-lower alkyl-1-piperazine, the group of the formula $—(C_{m'}H_{2m'})—$ stands for alkylene having from two to three, preferably two, carbon atoms (i.e. the letter *m'* stands for one of the integers 2 and 3, preferably for the integer 2), and separates the group Am from the oxygen atom by two to three, preferably by two, carbon atoms, Hal stands for halogeno, especially chloro, as well as bromo and the like, and the letter *p* stands for one of the integers 0, 1 and 2, particularly for 1, and acid addition, particularly pharmaceutically acceptable, non-toxic acid addition salts thereof.

The compounds of the present invention may be prepared according to methods known per se, for example, by converting in a compound having the formula:

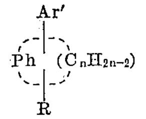

in which Ph, R, and the group of the formula $$—(C_nH_{2n-2})—$$

have the previously given meaning, and Ar' is a monocyclic carbocyclic aryl radical substituted by a hydroxyl group, or preferably a metal compound thereof, the hydroxyl group of the radical Ar' into a tertiary amino-lower alkyl-oxy group, and, if desired, converting a resulting salt into the free compound or into another salt, and/or, if desired, converting a resulting compound into an N-oxide or a quaternary ammonium compound there, and/or, if desired, converting a resulting compound or an N-oxide into a salt thereof, and/or, if desired, converting a quaternary ammonium compound into another quaternary ammonium compound, and/or, if desired, separating a mixture of isomers into the single isomers.

The conversion of the hydroxyl group attached to the radical Ar' into the desired tertiary amino-lower alkyl-oxy group is carried out according to known procedures. For example, the starting material having the phenolic hydroxyl group attached to the group Ar may be converted into a metal salt, particularly an alkali metal, e.g. lithium, sodium, potassium and the like, salt. Formation of the metal compound may be achieved, for example, by reacting the starting material with a metal compound-forming reagent, such as an alkali metal hydride or amide, e.g. lithium hydride, sodium hydride, sodamide, potassium amide and the like, or any other suitable reagent, such as an alkali metal lower alkanolate, e.g. lithium, sodium or potassium methanolate, ethanolate, tertiary butanolate and the like, or an alkali metal compound of a hydrocarbon, e.g. butyl lithium, phenyl lithium, phenyl sodium and the like. The preparation of the metal compounds is carried out in the presence of an inert solvent, e.g. hexane, benzene, toluene, xylene, diethyl ether, p-dioxane, tetrahydrofuran, diethyleneglycol dimethylether, N,N-dimethylformamide and the like, or any other suitable solvent, such as a lower alkanol, e.g. methanol, ethanol and the like.

The starting material, particularly the metal compound thereof, is then reacted with a reactive ester of a tertiary amino-lower alkanol, particularly a compound of the formula $Am—(C_mH_{2m})—X$, in which Am and the group of the formula $—(C_mH_{2m})—$ have the previously given meaning, and X stands for a reactive esterified hydroxyl group. The latter is above all a hydroxyl group esterified with a strong mineral acid, such as hydrohalic acid, e.g. hydrochloric, hydrobromic acid; therefore, the group X represents primarily halogeno, e.g. chloro, bromo and the like. It may also be a hydroxyl group esterified with a strong organic sulfonic acid, such as a lower alkane sulfonic acid, e.g. methane sulfonic, ethane sulfonic acid and the like, or a monocyclic carbocyclic aryl-sulfonic acid, e.g. p-toluene sulfonic acid and the like; thus, the group X may also stand for lower alkyl-sulfonyloxy, e.g. methylsulfonyloxy, ethylsulfonyloxy and the like, or monocyclic carbocyclic aryl-sulfonyloxy, e.g. p-tolylsulfonyloxy and the like. The preferred reactive esters of a tertiary amino-lower alkanol are those having the formula $Am—(C_mH_{2m})—Hal$, in which Am, and the group of the formula $—(C_mH_{2m})—$ have the previously given meaning, and Hal represents halogeno, particularly chloro.

The reaction of the starting material, particularly a metal compound thereof, with the reactive ester of a tertiary amino-lower alkanol is carried out in a suitable diluent, for example, in the solvent used for the preparation of a metal compound, if necessary, while cooling or at an elevated temperature, and/or, in the atmosphere of an inert gas, e.g. nitrogen.

The starting material used in the above reaction is known or may be prepared according to known methods.

The compounds of this invention may also be prepared, for example, by reacting a compound having the formula:

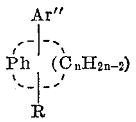

in which Ph, R and the group of the formula $$—(C_nH_{2n-2})—$$

have the previously given meaning, and Ar'' is a monocyclic carbocyclic aryl radical substituted by a reactive esterified hydroxy-lower alkyl-oxy group, in which the reactive esterified hydroxy portion is separated from oxy by at least two carbon atoms, with a secondary amine, and, if desired, carrying out the optional steps.

A reactive esterified hydroxy-lower alkyl-oxy group is particularly a group of the formula $—O—(C_mH_{2m})—X$, in which X and the group of the formula $—(C_mH_{2m})—$ have the previously given meaning; the reactive esterified group X is primarily a group Hal representing halogeno, particularly chloro, as well as a suitable organic sulfonyloxy group. The reaction of the starting material with the secondary amine, having preferably the formula H—Am, in which Am has the above given meaning, is carried out in such manner, that an excess of the amine or of any other suitable base is present to neutralize the generated acid; if necessary, the reaction mixture may be diluted with a suitable inert solvent.

The starting material used in the above reaction is prepared according to known methods, for example, by reacting the alkali metal compound of the starting material of the previous procedure with a halogeno-lower alkanol, and converting in a resulting compound, in which the monocyclic carbocyclic aryl group has a hydroxy-lower alkyl-oxy substituent, the hydroxyl group of such substituent into an esterified hydroxyl group, for example, by treatment with a thionyl halide, e.g. thionyl chloride and the like, or with an organic sulfonic acid halide, e.g. chloride and the like, in the presence of a suitable base, e.g. pyridine and the like.

The compounds of this invention may also be prepared by converting in a compound of the formula

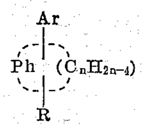

in which Ph, Ar and R have the previously given meaning, and the group of the formula $-(C_nH_{2n-4})-$ is an unbranched alkenylene radical having from three to five carbon atoms and carrying the groups Ar and R, the alkenylene radical of the formula $-(C_nH_{2n-4})-$ into the desired alkylene radical of the formula $$-(C_nH_{2n-2})-$$

having from three to five carbon atoms and carrying the groups Ar and R, and, if desired, carrying out the optional steps.

The conversion of the alkenylene radical into an alkylene radical is carried out according to methods known per se, for example, by treatment with an alkali metal, e.g. sodium and the like, in the presence of a lower alkanol, with metal amalgam in the presence of a hydrogen donor, e.g. sodium amalgam in the presence of moist diethyl ether, catalytically activated hydrogen, such as hydrogen in the presence of a palladium catalyst and the like, or any other suitable method.

The starting materials used in the above reaction may be prepared, for example, by converting in a compound of the formula

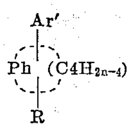

in which Ph, Ar', R and the group of the formula $$-(C_nH_{2n-4})-$$

have the previously given meaning, or preferably a metal salt thereof, the hydroxyl group of the radical Ar' into a tertiary amino-lower alkyl-oxy group; this reaction is carried out as previously shown, for example, by reacting the metal salt with a reactive ester of a tertiary amino-lower alkanol. The above unsaturated compounds having a group Ar' substituted by hydroxyl may be prepared, for example, by reacting a benzocycloalkanone compound, in which the cycloalkane portion carries the substituent R with a Grignard reagent of a monocyclic carbocyclic aryl halide substituted by a group capable of being converted into a hydroxyl group, e.g. lower alkoxy, benzyloxy and the like, if necessary, dihydrating a resulting benzocycloalkanol compound, and forming the hydroxyl group from the group capable of being so converted.

The compounds of this invention may also be prepared, for example, by replacing in a compound of the formula

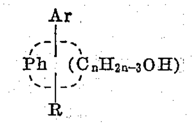

in which Ph, Ar and R have the previously-given meaning, and the radical of the formula $-(C_nH_{2n-3}OH)-$ is an unbranched alkylene radical having from three to five carbon atoms and carrying, in addition to the groups Ar and R, the hydroxyl group —OH, the latter by hydrogen, and carrying out the optional steps.

The hydroxyl group —OH is preferably attached to the same carbon atom as the group Ar, particularly in case the latter substitutes a carbon atom adjacent to the 1,2-phenylene radical. It may be replaced, for example, by treating the starting material with hydrogen in the presence of a catalyst, e.g. a palladium catalyst (for example, in the presence of acetic acid), Raney nickel and the like, if necessary, at an increased pressure and/or at an elevated temperature.

The starting materials used in the above reaction are prepared according to known methods, for example, by reacting a compound of the formula

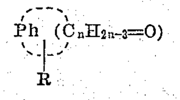

in which Ph and R have the previously-given meaning, and the group of the formula $-(C_nH_{2n-3}{=}O)-$ is an unbranched alkylene radical having from three to five carbon atoms and carrying, in addition to the group R, the oxo group =O, with a Grignard reagent of the formula $HalMg^{\oplus}[Ar]^{\ominus}$, in which Ar has the previously-given meaning, and Hal is halogeno, particularly bromo and the like, and carefully decomposing the resulting complex, for example, with aqueous ammonium chloride. The intermediates used in the above Grignard reaction are known or may be prepared according to known methods; the Grignard reagent may be prepared, for example, according to the "Method of Entrainment," described by Kharash and Reinmuth, Grignard Reactions of Nonmetallic Substances (Prentice-Hall, 1954). In case of R being one of the above- mentioned organic radical, the starting material may also be prepared, for example, by reacting a compound of the formula

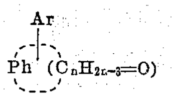

in which Ph, Ar and the group of the formula $$-(C_nH_{2n-3}{=}O)-$$

have the previously-given meaning, with a reagent of the formula $HalMg^{\oplus}[Ra]^{\ominus}$, in which Hal has the previously-given means, and $R_a$ stands for one of the organic radicals representing the group R.

The starting materials prepared according to the above procedure may also serve as intermediates for the preparation of the starting materials used in the previously-described method to form the compounds of this invention; upon dehydration, for example, in the presence of an acid, e.g. hydrochloric, sulfuric acid and the like, they are converted into the compounds of the formula

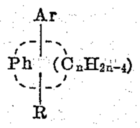

in which Ph, Ar, R and the radical of the formula $$-(C_nH_{2n-4})-$$

have the previously-given meaning.

The compounds of this invention may also be prepared, for example, by reacting a compound of the formula

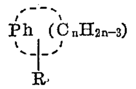

in which Ph and R have the previously-given meaning, and the group of the formula —($C_nH_{2n-3}$)— is an unbranched alkenylene radical, particularly a 1-alkenylene radical, having from three to five carbon atoms and carrying the group R, with a compound of the formula H—Ar, in which Ar has the previously-given meaning, in the presence of a strong Lewis acid, and, if desired, carrying out the optional steps.

The above reaction is carried out according to known methods, for example, by reacting the starting materials in the presence of a strong inorganic acid, e.g. sulfuric acid and the like. The starting materials used in the above reaction are known or may be prepared according to known methods; particularly useful as starting materials are compounds, in which the group R represents hydrogen.

A resulting salt may be converted into the free base, for example, by reacting it with an alkaline reagent, such as a metal hydroxide, e.g. lithium hydroxide, sodium hydroxide, potassium hydroxide and the like; metal carbonate, e.g. sodium or potassium carbonate or hydrogen carbonate and the like; ammonia and the like, or by treatment with a suitable hydroxyl ion exchange resin.

A resulting salt, particularly a salt with an inorganic acid, may be converted into another salt, for example, by reacting it with a suitable metal e.g. sodium, barium, silver and the like salt of an acid, preferably in the presence of a diluent, in which a resulting inorganic salt is insoluble and is thus removed from the reaction, or treating it with an anion exchange resin.

A free base may be converted into an acid addition salt thereof by reacting it or a solution thereof in a suitable solvent or solvent mixture with the acid or a solution thereof, or with a suitable anion exchange preparation, and isolating the desired salt. A salt may be obtained in the form of a hydrate thereof or may include solvent of crystallization.

An N-oxide of the compounds of this invention may be prepared, for example, by treating the free base with a suitable reagent, such as hydrogen peroxide, ozone or a peracid, e.g. peracetic, perbenzoic, monoperphthalic, persulfuric acid and the like, in a suitable inert solvent. An N-oxide may be converted into a salt thereof according to the above procedure.

The quaternary ammonium derivatives of the compounds of this invention may be obtained, for example, by reacting the base with a reactive ester of an alcohol and a strong acid, such as, for example, with one of the lower alkyl halides, di-lower alkyl-sulfates, lower alkyl sulfonates, phenyl-lower alkyl halides described above. The quaternizing reaction may be performed in the absence or presence of a solvent, while cooling or at an elevated temperature, if necessary, in a closed vessel and/or in the atmosphere of an inert gas, e.g. nitrogen and the like. Resulting quaternary ammonium compounds may be converted into other quaternary ammonium compounds, such as quaternary ammonium hydroxides, for example, by reacting a quaternary ammonium halide with silver oxide, or a quaternary ammonium sulfate with barium hydroxide, by treating a quaternary ammonium salt with a hydroxyl ion exchange preparation, by electrodialysis or any other suitable method. A quaternary ammonium hydroxide may be converted into a quaternary ammonium salt by reacting the former with a suitable acid. A quaternary ammonium salt may also be converted directly into another quaternary ammonium salt; for example, a quaternary ammonium iodide may be reacted with freshly prepared silver chloride or with hydrochloric acid in anhydrous methanol to yield the desired quaternary ammonium chloride, or a quaternary ammonium salt may be treated with a suitable anion exchange resin and thus be converted into another quaternary ammonium salt. A quaternary ammonium compound may be obtained in the form of a hydrate thereof or may contain solvent of crystallization.

A mixture of resulting isomeric compounds may be separated into the single isomers. For example, a mixture of diastereoisomers may be separated into the individual racemic compounds on the basis of physico-chemical differences, such as solubility, for example, by fractional crystallization and the like. Racemates may be resolved into the optically active d- and l-forms according to known resolution procedures, for example, by forming a salt of the free racemic base with one of the optically active forms of an acid containing an asymmetric carbon atom. Especially useful as optically active forms of salt-forming acids having an asymmetric carbon atom are D-tartaric (l-tartaric) acid and L-tartaric (d-tartaric) acid, as well as the optically active forms of malic, mandelic, 10-camphor sulfonic, quinic acid and the like. From a resulting salt, the free and optically active base may be obtained according to the method described above, and a free and optically active base may be converted into its acid addition salt, N-oxide, salt of an N-oxide or quaternary ammonium compound according to the procedures described above.

The invention also comprises any modification of the process wherein a compound formed as an intermediate at any stage of the process, is used as starting material and the remaining step(s) of the process is(are) carried out, as well as any new intermediates.

In the process of this invention such starting materials are preferably used which lead to final products mentioned in the beginning as preferred embodiments of the invention.

The following examples are intended to illustrates the invention and are not to be construed as being limitations thereon. Temperatures given in degrees centigrade.

*Example 1*

A solution of 10.0 g. of 1-(4-hydroxy-phenyl)-indane in xylene is added to a hot mixture of 3.5 of a 50 percent mineral oil suspension of sodium hydride in xylene while stirring. The mixture is refluxed for three hours, then cooled to room temperature, and treated dropwise with 8.0 g. of 2-N,N-diethylaminoethyl chloride. After refluxing for 16 hours and cooling, the reaction mixture is extracted with concentrated hydrochloric acid; the aqueous phase is made basic with ammonium hydroxide and extracted with diethyl ether. The organic extract is washed with water, dried over sodium sulfate and evaporated to dryness. The residue is distilled to yield the 1-[4-(2-N,N-diethylaminoethyl)-oxy-phenyl]-indane of the formula:

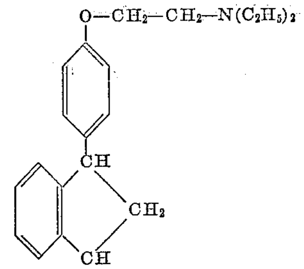

which boils at 175–177°/0.1 mm.; yield: 9 g.

The hydrochloride salt of 1-[4-(2-N,N-diethylaminoethyl)-oxy-phenyl]-indane, M.P. 130–133°, is prepared by treating a solution of the free base with hydrogen chloride and recrystallizing the resulting salt from a mixture of ethanol and diethyl ether.

*Example 2*

The sodium salt of 1-(4-hydroxy-phenyl)-indane, prepared from 20.0 g. of 1-(4-hydroxy-phenyl)-indane and 7.0 g. of a 50 percent mineral oil suspension of sodium hydride in xylene, is treated with 17.7 g. of 3-N,N-dimethylaminopropyl chloride. The reaction is carried out as described in Example 1; the resulting 1-[4-(3-N,N-dimethylaminopropyl)-oxy-phenyl]-indane of the formula:

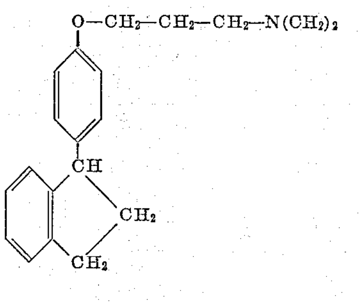

boils at 168–170°/0.4 mm.

*Example 3*

The 1-[4-(N,N-dimethylaminoisopropyl)-oxy-phenyl]-indane of the formula

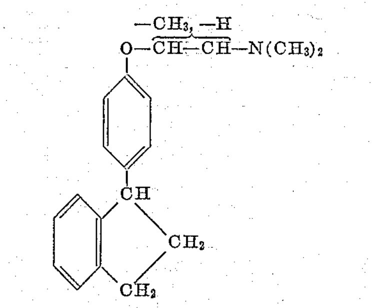

is prepared by reacting 10.0 g. of 1-(4-hydroxy-phenyl)-indane with 3.5 g. of a 50 percent mineral oil suspension of sodium hydride in xylene, and treating the resulting sodium salt of 1-(4-hydroxy-phenyl)-indane with 7.2 g. of N,N-dimethylamino-isopropyl chloride according to the procedure described in Example 1; the resulting base boils at 170–173°/0.2 mm.; yield: 8.75 g.

*Example 4*

The sodium salt of 1-(4-hydroxy-phenyl)-indane is prepared by reacting 10.0 g. of 1-(4-hydroxy-phenyl)-indane with 2.5 g. of a 54 percent suspension of sodium hydride in xylene according to the method described in Example 1; the solution of this salt is reacted with 5.7 g. of 2-N,N-dimethylaminoethyl chloride, and the reaction mixture is worked up as shown in Example 1 to yield 9 g. of 1-[4-(2-N,N-dimethylaminoethyl)-oxyphenyl]-indane of the formula

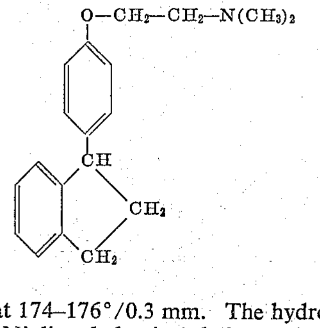

which boils at 174–176°/0.3 mm. The hydrochloride salt of 1-[4-2-N,N'-dimethylaminoethyl-oxy-phenyl]-indane melts at 178–180° after recrystallization from a mixture of ethanol and diethyl ether.

*Example 5*

The 1-{4-[2-(1-piperidino)-ethyl]-oxy-phenyl}-indane of the formula

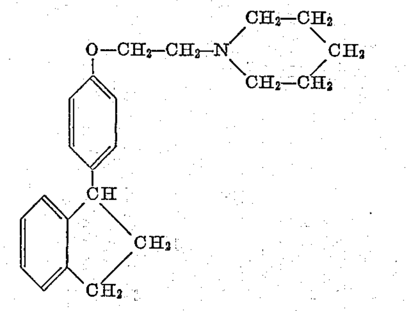

B.P. 199–201°/0.25 mm., is prepared by reacting 10.0 g. of 1-(4-hydroxy-phenyl)-indane with 2.5 g. of a 54 percent mineral oil suspension of sodium hydride in xylene and treating the resulting salt with 8.7 g. of 2-(1-piperidino)-ethyl chloride; 8.5 g. of the desired 1-{4-[2-(1-piperdino)-ethyl]-oxy-phenyl}-indane is recovered and converted into its hydrochloride salt, M.P. 160–163° (after recrystallization from a mixture of ethanol and diethyl ether).

*Example 6*

To a mixture of 1.67 g. of sodium hydride (as a 50 percent suspension in mineral oil) in 50 ml. of xylene while heating almost to reflux, is added dropwise a solution of 7 g. of 1-(3-chloro-4-hydroxy-phenyl)-indane in xylene. The reaction mixture is refluxed for three hours; a solution of 3.8 g. of 2-N,N-diethylaminoethyl chloride in xylene is then added while stirring, and refluxing is continued overnight. After cooling, the reaction mixture is acidified by cautiously adding 15 percent aqueous hydrochloric acid. The aqueous layer is separated, made basic with ammonium hydroxide and extracted with diethyl ether. The organic phase is separated, washed with water, dried over magnesium sulfate and evaporated to yield the 1-[3-chloro-4-(2-N,N-diethylaminoethyl)-oxy-phenyl]-indane of the formula

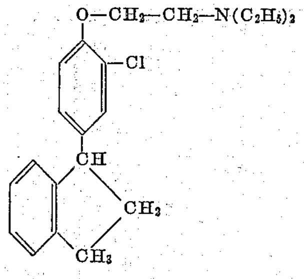

which is converted into its hydrochloride, M.P. 147–149°, by treating a solution of the free base in ethanol with hydrogen chloride and recrystallizing the salt from ethanol.

The starting material used in the above procedure is prepared as follows: A total of 42.0 g. of 1-(4-hydroxy-phenyl)-indane is gradually added to a solution of 4.6 g. of sodium in 200 ml. of ethanol. The reaction mixture is refluxed for two hours, the ethanol is evaporated and the residue is dried for two days under high vacuum to yield the sodium salt of 1-(4-hydroxy-phenyl)-indane which is then dissolved in 150 ml. of carbon disulfide. Chlorine gas is bubbled through the solution until one molar equivalent is absorbed, maintaining a temperature of 20–25° with ice-cooling. The inorganic precipitate is filtered off, the carbon disulfide is evaporated under reduced pressure, and the residue is diluted with water. The organic material is extracted with diethyl ether, the organic layer is separated, dried over magnesium sulfate and evaporated to yield the 1-(3-chloro-4-hydroxy-phenyl)-indane, which purified by distillation and is collected at 160–163°/0.5 mm. A small amount of the 1-(3,5-dichloro-4-hydroxy-phenyl)-indane is collected at 175°/0.5 mm.

*Example 7*

A mixture of 2.4 g. of 1-(4-hydroxy-phenyl)-1-methyl-1,2,3,4-tetrahydro-naphthalene and 0.5 g. of a 53 percent suspension of sodium hydride in 20 ml. of N,N-dimethylformamide is stirred for one hour and then treated with 1.16 g. of 2-N,N-diethylaminoethyl chloride in 20 ml. of toluene. The reaction mixture is allowed to stand at room temperature for 18 hours, concentrated to a volume of about 10 ml. and diluted with water. The organic material is extracted with diethyl ether; the organic extracts are combined and washed with 1N aqueous hydrochloric acid. The acid solution is made basic with concentrated ammonium hydroxide, and the desired 1-[4-(2-N,N-diethylaminoethyl)-oxyphenyl]- 1-methyl-1,2,3,4-tetrahydro-naphthalene of the formula

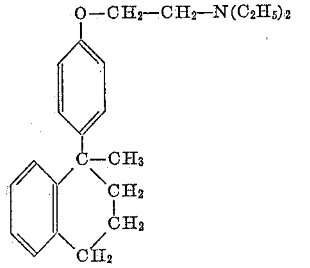

is extracted with diethyl ether, and isolated by evaporating the dried ether solution and distilling the residue, B.P. 159–161°/0.05 mm.

The starting material used in the above procedure is prepared as follows: A mixture of 16.2 g. of 1-methyl-1,2,3,4-tetrahydro-naphthalene, 18.8 g. of phenol and 2.5 g. of aluminum chloride in 200 ml. of hexane is stirred for one hour at room temperature and for another hour at 40–50°. After standing overnight at room temperature, the reaction mixture is again warmed to 40–50°, filtered while warm, and the filtrate is stirred into 200 ml. of warm water. The organic layer is separated, washed with dilute aqueous hydrochloric acid, water and a saturated aqueous solution of sodium chloride, dried over sodium sulfate and evaporated to dryness. The 1-(4-hydroxy-phenyl)-1-methyl-1,2,3,4 - tetrahydro - naphthalene, obtained as a slightly brown oil, crystallizes, M.P. 123–124°.

*Example 8*

To a solution of 3.17 g. of 1-[3,5-dichloro-4-hydroxy-phenyl]-1-methyl-1,2,3,4 - tetrahydro - naphthalene in 25 ml. of N,N-dimethylformamide is added 0.48 g. of a 53 percent suspension of sodium hydride in mineral oil; the mixture is stirred for one hour and then treated with 1.35 g. of 2-N,N-diethylaminoethyl chloride in 20 ml, of toluene. The reaction mixture is allowed to stand at room temperature for 18 hours and is then concentrated to a volume of about 10 ml. and diluted with water. The aqueous mixture is extracted with diethyl ether, the organic phase is separated and washed with 1 N aqueous hydrochloric acid. The desired 1-[3,5-dichloro-4-(2-N,N-diethylaminoethyl)-oxy-phenyl]-1-methyl-1,2,3,4-tetrahydro-naphthalene hydrochloride of the formula

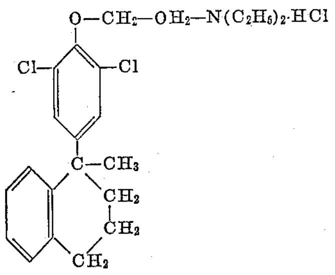

crystallizes spontaneously, is collected and recrystallized twice from a mixture of acetone and diethyl ether, M.P. 174–175°; yield: 2.35 g.

The starting material used in the above reaction is prepared as follows: A solution of 1-(4-hydroxy-phenyl)-1-methyl-1,2,3,4-tetrahydro-naphthalene in 13 g. of sulfuryl chloride is heated to reflux for three hours. The excess of sulfuryl chloride is removed under reduced pressure and the remaining dark oil is dissolved in diethyl ether. The organic solution is washed with 25 ml. of a saturated aqueous solution of sodium hydrogen carbonate and a saturated aqueous solution of sodium chloride, dried over sodium sulfate and evaporated to dryness. The dark viscous oil is distilled to yield the colorless 4-(3,5-dichloro-4-hydroxyphenyl)-1-methyl-1,2,3,4-tetrahydro-naphthalene, B.P. 140–143°/0.05 mm.

*Example 9*

To a mixture of 1.68 g. of sodium hydride preparation (50 percent suspension of sodium hydride in mineral oil) in xylene is added dropwise a solution of 8.8 g. of 1-(3,5-dichloro-4-hydroxy)-indane in xylene while heating almost to reflux. The reaction mixture is refluxed for three hours and treated dropwise with 4.75 g. of 2-N,N-diethylaminoethyl chloride in xylene while stirring. After refluxing overnight, 15 percent aqueous hydrochloric acid is cautiously added; the aqueous layer is separated and made basic with aqueous ammonia. The organic material is extracted with diethyl ether, the organic solution is washed, dried and evaporated to yield the desired 1-[3,5-dichloro - 4 - (2-N,N-diethylaminoethyl-oxy-phenyl]-indane of the formula

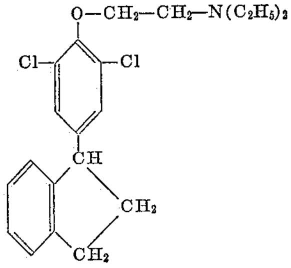

which is purified by distillation, B.P. 197–200°/0.2 mm. Its hydrochloride, formed by adding ethanolic hydrogen chloride and diethyl ether to the free base, melts at 139–142° after recrystallization from a mixture of ethanol and diethyl ether.

The starting material used in the above example may be prepared as follows: Chlorine gas is bubbled during 45 minutes through a solution of 15 g. of the sodium salt of 1-(4-hydroxy-phenyl)-indane (prepared as described in Example 1) in 225 ml. of carbon disulfide while stirring and cooling. The inorganic precipitate is filtered off, the filtrate is evaporated under reduced pressure and the residue is diluted with water. The organic material is extracted with diethyl ether; the organic solution is dried over magnesium sulfate and evaporated. The residue is distilled to yield the 1-(3,5-dichloro-4-hydroxy-phenyl)-indane, B.P. 163–165°/0.2 mm.

Other compounds, which may be prepared according to the above-described method are, for example, 1-[3-chloro-4-(2-N,N-diethylamino-2-methyl-ethyl)-oxy-phenyl]-indane,
1-{3-bromo-4-[2-(4-methyl-1-piperazino)-ethyl]-oxy-phenyl}-indane,
5-chloro-1-[4-(2-N,N-diethylaminoethyl)-oxy-phenyl]-indane,
6-chloro-1-{4-[2-(1-pyrrolidino)-ethyl]-oxy-phenyl}-indane,
5-methyl-1-{3-[3-(4-morpholino)-propyl}-oxy-phenyl]-indane,
2-[4-(2-N,N-diethylaminoethyl)-oxy-phenyl]-5-methoxy-indane, 1-[4-(2-N,N-diethylaminoethyl)-oxy-phenyl]-1,2,3,4-tetrahydronaphthalene,
6-chloro-1-{4-[2-(1-piperidino)-ethyl]-oxy-phenyl}-1,2,3,4-tetrahydro-naphthalene,
8-chloro-2-{4-[2-(4-morpholino)-ethyl]-oxy-phenyl}-1,2,3,4-tetrahydro-naphthalene,
1-[3-chloro-4-(2-N,N-diethylaminoethyl)-oxy-phenyl]-1,2,3,4-tetrahydro-naphthalene,
2-(4-chloro-phenyl)-1-[4-(2-N,N-diethylaminoethyl)-oxy-phenyl]-indane,
6-chloro-2-{3-[3-(1-piperidino)-propyl]-oxy-phenyl}-indane,
2-[4-(2-N,N-diethylaminoethyl)-oxy-phenyl]-1,2,3,4-tetrahydro-naphthalene,
1-[4-(2-N,N-diethylaminoethyl)-oxy-phenyl]-benzosurberan and the like.

These compounds may be converted into their pharmaceutically acceptable acid addition salts, e.g. hydrochlorides, hydrobromides, maleates and the like, according to the previous procedure. The lower alkyl quaternary ammonium halides, such as the methochlorides, methiodides and the like, of these compounds may be prepared, for example, by reacting the free compounds with an excess of a lower alkyl halide, e.g. methyl iodide and the like, if necessary in a closed vessel and/or at an elevated temperature. The N-oxides, which may be obtained by treatment with a suitable organic percarboxylic acid, e.g. perbenzoic acid and the like, in an inert solvent, especially a halogenated hydrocarbon, may be converted into their acid addition salt according to the procedure described above.

*Example 10*

The compounds of this invention may be used in the form of compositions for enteral, parenteral or topical use, which contain the new compounds in admixture with a suitable pharmaceutical organic or inorganic, solid or liquid carrier. For making up the preparation there can be employed carriers which do not react with the new compounds, such as water, gelatine, lactose, starches, stearic acid, magnesium stearate, sodium lauryl sulfate, talc, vegetable oils, alcohol, benzyl alcohol, cetyl alcohol, petrolatum, gums, propylene glycol, polyalkylene glycols or any other carrier used for pharmaceutical preparations. The latter may be in solid form, for example, as capsules, tablets, dragees and the like, in liquid form, for example, as solutions, suspensions and the like, or as emulsions, such as creams, ointments and the like. If necessary, these preparations may contain auxiliary substances, such as preserving stabilizing, wetting, emulsifying, coloring, flavoring agents and the like, salts for varying the osmotic pressure, buffers, etc., and may also contain, in combination, other useful substances.

Thus, the compounds of this invention, being useful in the treatment of superficial dermatophytoses, may be applied in the form of pharmaceutical compositions for topical use, containing from about 0.1 percent to about 10 percent, especially from about 0.5 percent to about 5 percent, of the active ingredient, particularly of a compound having the following formula:

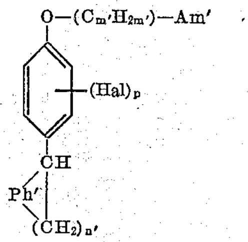

in which Ph', the group $-(CH_2)_{n'}-$, Am', the group $-(C_{m'}H_{2m'})-$, Hal and the letter *p* have the previously given meaning, being particularly 1,2-phenylene, an unbranched alkylene radical having two carbon atoms, N,N-di-lower alkyl-amino, an alkylene radical having two carbon atoms and separating Am' from the oxygen atom by two carbon atoms (i.e. 1,2-ethylene), chloro, and the integer 1, respectively, or an acid addition, particularly a pharmaceutically acceptable acid addition, salt thereof. The compositions may be formulated according to known methods used in the art of manufacturing pharmaceutical preparations.

For example, an ointment containing 1 percent of 1-[3-chloro-4-(2-N,N-diethylaminoethyl)-oxy-phenyl]-indane hydrochloride as the active ingredient is prepared as follows (for 100.0 g.):

| Ingredients: | G. |
|---|---|
| 1-[3-chloro-4-(2-N,N-diethylaminoethyl)-oxy-phenyl]-indane hydrochloride | 1.0 |
| Liquid petrolatum | 5.0 |
| White petrolatum | 94.0 |

The 1-[3-chloro-4-(2-N,N-diethylaminoethyl)-oxy-phenyl]-indane hydrochloride is mixed with the liquid petrolatum by using a mortar until an adequate reduction in particle size is accomplished. The white petrolatum is then slowly blended with this mixture; the ointment is passed through a three roller mill, until total uniformity is obtained and filled into epoxy lined tubes (5 g.).

A cream, containing 1 percent of 1-[3-chloro-4-(2-N,N-diethylaminoethyl)-oxy-phenyl]-indane hydrochoride as the active ingredient is prepared as follows (for 100.0 g.):

| Ingredients: | G. |
|---|---|
| 1-[3-chloro-4-(2-N,N-diethylaminoethyl)-oxy-phenyl]-indane hydrochloride | 1.0 |
| Propylene glycol | 15.0 |
| Sodium lauryl sulfate | 2.0 |
| Cetyl alcohol | 15.0 |
| Phenyl mercuric acetate | 0.002 |
| Purified water, q.s. 100.0 g. | |

The phenylmercuric acetate is dissolved in 65 ml. of water at 90°; subsequently the sodium lauryl sulfate is added and the temperature is reduced to 70°. The cetyl alcohol is melted at 70° and added to the aqueous solution while vigorously agitating. Stirring is continued while cooling the mixture to 45°.

The 1-[3-chloro-4-(2-N,N-diethylaminoethyl)-oxy-phenyl]-indane hydrochloride is dispersed in the propylene glycol at 45° and added to the above emulsion while agitating. Sufficient water is added to bring the weight to 100 g., and mixing is continued while the product cools to room temperature. The cream is passed through a three roller mill until total uniformity is accomplished and is filled into epoxy lined tubes (5 g.).

A substituent may be introduced into the 1,2-phenylene portion of a resulting compound. For example, upon nitration with a suitable nitrating reagent a nitro group may be introduced into the aromatic portion. Substituents attached to the 1,2-phenylene portion of the resulting compounds may be converted into other substituents. For example, a nitro group may be converted into other substituents. For example, a nitro group may be reduced to an amino group according to known reduction methods, for example, by controlled treatment with hydrogen in the presence of a suitable catalyst, e.g. palladium on charcoal and the like, and of an inert solvent, e.g. p-dioxane and the like, or converted into an N,N-di-lower alkyl-amino, particularly N,N-dimethylamino, group, if the reduction is carried out in the presence of a lower alkanal, particularly formaldehyde. An amino group may be converted into a halogeno atom by diazotization, followed by treatment with a cuprous halide according to the Sandmeyer reaction. Or, lower alkoxy, e.g. methoxy and the like, group may be converted into a free hydroxyl group by acidic hydrolysis, for example, by treatment with hydrobromic acid in the presence of acetic acid and the like.

What is claimed is:

1. A pharmaceutical composition for topical use containing from about 0.1 percent to about 10 percent of a member selected from the group consisting of a compound having the formula

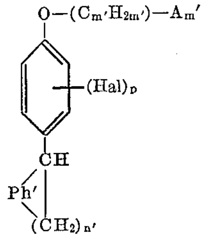

in which Ph′ stands for a member selected from the group consisting of 1,2-phenylene, (lower alkyl)-1,2-phenylene, (lower alkoxy)-1,2-phenylene, (halogeno)-1,2-phenylene, (nitro)-1,2-phenylene, (N,N-di-lower alkyl-amino)-1,2-phenylene and (trifluoromethyl)-1,2-phenylene, the group of the formula $-(CH_2)_{n'}$ represents unbranched alkylene having from two to three carbon atoms, Am′ is a member selected from the group consisting of N,N-lower alkyl-amino, N,N-alkylene-imino, in which alkylene has from four to seven carbon atoms, 4-morpholino and 4-lower alkyl-1-piperazino, the group of the formula $-(C_{m'}H_{2m'})-$ represents alkylene having from two to three carbon atoms and separating the group Am′ from the oxygen atom by two to three carbon atoms, Hal is chloro and the letter *p* stands for one of the integers 0, 1 and 2, and a pharmaceutically acceptable, non-toxic acid addition salt thereof, the N-oxide thereof, a pharmaceutically acceptable acid addition salt of the N-oxide thereof and a pharmaceutically acceptable quaternary ammonium salt thereof as the active ingredient, together with a pharmaceutically acceptable carrier therefor.

2. A pharmaceutical composition for topical use containing from about 0.5 percent to about 5 percent of 1-[3-chloro-4-(2-N,N-di-ethylaminoethyl)-oxy-phenyl]-indane, together with a pharmaceutically acceptable carrier therefor.

3. A pharmaceutical composition for topical use containing from about 0.5 percent to about 5 percent of an acid addition salt of 1-[3-chloro-4-(2-N,N-diethylaminoethyl)-oxy-phenyl]-indane, together with a carrier therefor.

References Cited by the Examiner

UNITED STATES PATENTS

| | | | |
|---|---|---|---|
| 2,510,946 | 6/1950 | Baker | 167—58 |
| 2,524,738 | 10/1950 | Snell et al. | 167—58 |
| 2,763,687 | 9/1956 | Kerwin et al. | 260—570.7 |
| 2,796,435 | 6/1957 | Goldberg et al. | 260—570.7 |

LEWIS GOTTS, *Primary Examiner.*

CHARLES B. PARKER, FRANK CACCIAPAGLIA, JR., *Examiners.*